US010123352B2

United States Patent
Ahmed et al.

(10) Patent No.: US 10,123,352 B2
(45) Date of Patent: Nov. 6, 2018

(54) FAIRNESS IN WIRELESS NETWORKS WITH ADAPTIVE CLEAR CHANNEL ASSESSMENT THRESHOLDS

(71) Applicant: Nokia Technologies Oy, Espoo (FI)

(72) Inventors: Wessam Afifi Ahmed, Tucson, AZ (US); Enrico-Henrik Rantala, Berkeley, CA (US); Esa Juhani Tuomaala, El Cerrito, CA (US); Sayantan Choudhury, Berkeley, CA (US)

(73) Assignee: Nokia Technologies Oy, Espoo (FI)

( * ) Notice: Subject to any disclaimer, the term of this patent is extended or adjusted under 35 U.S.C. 154(b) by 50 days.

(21) Appl. No.: 15/248,029

(22) Filed: Aug. 26, 2016

(65) Prior Publication Data

US 2017/0079068 A1    Mar. 16, 2017

Related U.S. Application Data

(60) Provisional application No. 62/218,183, filed on Sep. 14, 2015.

(51) Int. Cl.
*H04W 74/08* (2009.01)
*H04W 84/12* (2009.01)

(52) U.S. Cl.
CPC ........ *H04W 74/0816* (2013.01); *H04W 84/12* (2013.01)

(58) Field of Classification Search
None
See application file for complete search history.

(56) References Cited

U.S. PATENT DOCUMENTS

2007/0286122 A1* 12/2007 Fonseca ............ H04L 1/0021
370/329
2014/0198741 A1* 7/2014 Barriac ............ H04W 74/006
370/329

(Continued)

FOREIGN PATENT DOCUMENTS

WO    2015/089229 A1    6/2015

OTHER PUBLICATIONS

Legacy Fairness Issues of Enhanced CCA (doc. IEEE 802.11-15/0085r1; Jan. 2015) by John Son, Geonjung Ko and Jin Sam Kwak (https://mentor.ieee.org/802.11/dcn/15/11-15-0085-01-00ax-legacy-fairness-issues-of-enhanced-cca.pptx, last visited Aug. 25, 2015).

(Continued)

*Primary Examiner* — Diane Lo
(74) *Attorney, Agent, or Firm* — Harrington & Smith

(57) ABSTRACT

When contending for access to a radio channel (for example CSMA/CA in Wi-Fi), an apparatus selects a first clear channel assessment (CCA) threshold that is higher than a minimum; determines to temporarily use a second CCA threshold that is lower than the first CCA threshold; and based on this determination it selects the second CCA threshold for a specified time period. In one embodiment this determination is based on the apparatus' use of a spectrum relative to a threshold usage level which may be calculated as a number of successful transmissions by the apparatus on the spectrum over a predefined time period; and/or as a deferring time experienced by the apparatus with respect to the spectrum over a predefined time period. In an embodiment the specified time period comprises a backoff time, and the determination to temporarily use the second CCA threshold is triggered by a periodic timer.

19 Claims, 7 Drawing Sheets

(56) References Cited

U.S. PATENT DOCUMENTS

2015/0009907 A1* 1/2015 Merlin .............. H04W 74/0808
370/329
2015/0032868 A1* 1/2015 Sung .................... H04L 1/0021
709/221

OTHER PUBLICATIONS

OBSS reuse mechanism which preserves fairness (doc. IEEE 802.11-15/1207r1; Sep. 2014) by Imad Jamil, Laurent Cariou and Thomas Derham (https://mentor.ieee.org/802.11/dcn/14/11-14-1207-01-00ax-obss-reuse-mechanism-which-preserves-fairness.ppt), last visited Aug. 25, 2015).

CSMA Self-Adaptation based on Interference Differentiation (Global Telecommunications Conference, 2007; Nov. 26-30, 2007) by Jing Zhu, Xingang Guo, Sumit Roy and Konstantina Papagiannaki; (http://www.ee.washington.edu/research/funlab/Publications/2007/2007_jing_csma_self_adaptation_CCA_PW_self_Globecom07.pdf.

Impact of TPC coupled to DSC for legacy unfairness issue (doc. IEEE 802.11-15/0319r1; Mar. 2015) by Takeshi Itagaki, Masahito Mori, Tsuguhide Aoki, Koichi Ishihara, Shako Shinohara and Yasuhiko Inoue (https://mentor.ieee.org/802.11/dcn/15/11-15-0319-01-00ax-impact-of-tpc-coupled-to-dsc-for-legacy-unfairness-issue.pptx), last visited Aug. 25, 2015).

TG ax DSC Summary (doc. IEEE 802.11-15/0807r2; Jul. 2015) by Graham Smith (https://mentor.ieee.org/802.11/dcn/15/11-15-0807-02-00ax-dsc-summary.pptx), last visited Aug. 25, 2015).

Further Considerations on Legacy Fairness with Enhanced CCA (doc. IEEE 802,11-15/03740; Mar 10, 2015) by John Son, Geonjung Ko, Jin Sam Kwak, Young Doo Kim and Hong Seok Shin (https://mentor.ieee.org/802.11/dcn/15/11-15-0374-01-00ax-further-considerations-on-legacy-fairness-with-enhanced-cca.pptx), last visited Aug. 25, 2015).

* cited by examiner

FAIRNESS IN WIRELESS NETWORKS WITH ADAPTIVE CLEAR CHANNEL ASSESSMENT THRESHOLDS

CROSS REFERENCE TO RELATED APPLICATION

This application claims priority to provisional U.S. patent application Ser. No. 62/218,183 filed on Sep. 14, 2015, the entire contents of which are hereby incorporated by reference.

TECHNOLOGICAL FIELD

The described invention relates to wireless communications, and more particularly to procedures by which multiple users/nodes contend for access to a radio channel, such as for example carrier sense multiple access with collision avoidance (CSMA/CA) in Wi-Fi or other radio access technologies.

BACKGROUND

The exponential increase in the number of mobile users and devices (smart phones, tablets, etc.) and the emerging technologies (e.g., Internet of Things (IoT), digital health, and immersive multimedia) create a substantial challenge to the design of the next generation wireless local area networks (WLANs). The volume of mobile data traffic is also growing rapidly; it is estimated that over ⅔ of mobile data traffic will be video by the year 2018. These factors are expected to cause a spectrum crisis known colloquially as the 1000× challenge, where the wireless demand on the year 2020 is expected to be 1000× greater than the demand in 2010.

When multiple users contend for available radio resources (typically time and frequency) in a specific geographic area, media access control (MAC) protocols are typically used to organize the communication process between nodes/users and the radio access node (in the case of centralized systems, such as the AP in WLAN systems) or communications directly among the users/nodes (in the case of distributed or ad hoc systems). Carrier Sense Multiple Access with Collision Avoidance (CSMA/CA, also referred to as the distributed coordination function (DCF) or more informally as listen-before-talk), is a widely used MAC protocol based on random channel access. Stations (STAs) perform a clear channel assessment (CCA) to check that the channel is clear before transmitting. In this regard the following documents explore how to allow the CCA to be adaptive for use in future WLAN systems such as IEEE 802.11ax to better accommodate the expected increase in users and traffic volume.

*Legacy Fairness Issues of Enhanced CCA* (doe. IEEE 802.11-15-0085r1; January 2015) by John Son, Geonjung Ko and Jin Sam Kwak (https://mentor.ieee.org/802.11/dcn/15/11-15-0085-01-00ax-legacy-fairness-issues-of-enhanced-cca.pptx, last visited Aug. 25, 2015);

System and method for determining a clear channel assessment threshold (WO 2015089229; Jun. 18, 2015) by Lukasz Krzymien, George Calcev, Lin Cai and Hanan Ahmed;

*CSMA Self-Adaptation based on Interference Differentiation* (Global Telecommunications Conference, 2007; 26-30 Nov. 2007) by Jing Zhu, Xingang Guo, Sumit Roy and Konstantina Papagiannaki; (http://www.ee.washington. edukesearch/funlab/Publications/2007/2007_jing_csma_self_adaptation_CCA_PW_self_Globecom07.pdf, last visited Aug. 25, 2015);

*Impact of TPC coupled to DSC for legacy unfairness issue* (doc. IEEE 802.11-15/0319r1; March 2015) by Takeshi Itagaki, Masahito Mori, Tsuguhide Aoki, Koichi Ishihara, Shoko Shinohara and Yasuhiko Inoue (https://mentor.ieee.org/802.11/dcn/15/11-15-0319-01-00ax-impact-of-tpc-coupled-to-dsc-for-legacy-unfairness-issue.pptx), last visited Aug. 25, 2015);

*TG ax DSC Summary* (doc. IEEE 802.11-15-0807r2; July 2015) by Graham Smith (https://mentor.ieee.org/802.11/dcn/15/11-15-0807-02-00ax-dsc-summary.pptx), last visited Aug. 25, 2015);

*Further Considerations on Legacy Fairness with Enhanced CCA* (doc. IEEE 802.11-15/0374r1; Mar. 10, 2015) by John Son, Geonjung Ko, Jin Sam Kwak, Young Doo Kim and Hong Seok Shin (https://mentor.ieee.org/802.11/dcn/15/11-15-0374-01-00ax-further-considerations-on-legacy-fairness-with-enhanced-cca.pptx), last visited Aug. 25, 2015); and

*OBSS reuse mechanism which preserves fairness* (doe. IEEE 802.11-15/1207r1; September, 2014) by Imad Jamil, Laurent Cariou and Thomas Derham (https://mentor.ieee.org/802.11/dcn/14/11-14-1207-01-00ax-obss-reuse-mechanism-which-preserves-fairness.ppt), last visited Aug. 25, 2015).

SUMMARY

In accordance with a first embodiment of these teachings there is a method in which an apparatus selects a first clear channel assessment threshold that is higher than a minimum clear channel assessment threshold; determines to temporarily use a second clear channel assessment threshold that is lower than the first clear channel assessment threshold; and based on that determining it selects the second clear channel assessment threshold for a specified time period.

In accordance with a second embodiment of these teachings there is an apparatus comprising at least one processor and at least one non-transitory memory including computer program code. In this second embodiment the at least one memory and the computer program code are configured, with the at least one processor, to cause the apparatus to select a first clear channel assessment threshold that is higher than a minimum clear channel assessment threshold; to determine to temporarily use a second clear channel assessment threshold that is lower than the first clear channel assessment threshold; and based on said determining to select the second clear channel assessment threshold for a specified time period.

In accordance with a third embodiment there is a computer readable memory tangibly storing computer program code. This stored computer program code, when executed by one or more processors of an apparatus, causes the apparatus to select a first clear channel assessment threshold that is higher than a minimum clear channel assessment threshold; determine to temporarily use a second clear channel assessment threshold that is lower than the first clear channel assessment threshold; and based on said determining causes the apparatus to select the second clear channel assessment threshold for a specified time period.

DETAILED DESCRIPTION

In general for CSMA/CA in WLAN systems, when a STA has an uplink message(s) to send to the AP it performs a clear channel assessment (CCA) by sensing the medium (radio channel) for a fixed duration and comparing the outcome of the sensed channel energy (RSSI) against a CCA threshold. If the measured energy on the channel is lower than the CCA threshold, this indicates there is no competing traffic and the STA starts the transmission. If instead the measured energy is higher than the CCA threshold, the conclusion is that the channel is busy and the STA continues sensing the channel. Once the sensed channel energy is below the CCA threshold the channel is adjudged to be idle and the STA waits for a random backoff time. If at the end of the random backoff time the channel is still idle, the STA starts its transmission. The added backoff time is to prevent collisions once the channel becomes idle, in case other STAs also sensed the channel to be busy.

IEEE 802.11ax seeks to increase the efficiency of spatial reuse of spectrum in future WLAN systems to increase throughput. One way to do so is to allow higher CCA thresholds for STAs with a higher RSSI. This means that STAs nearer the AP may consider the channel idle even if there is a transmission that other STAs further from the AP would hear and consider the channel busy. This is workable because STAs near one AP (or basic service set BSS) typically do not cause much interference to other APs/BSSs. In general for IEE 802.1 lax this concept is known as adaptive CCA thresholds. But as some of the references above note, there is a fairness issue concerning STAs using the lower CCA threshold having a reasonable opportunity to access the channel.

Figure 1:
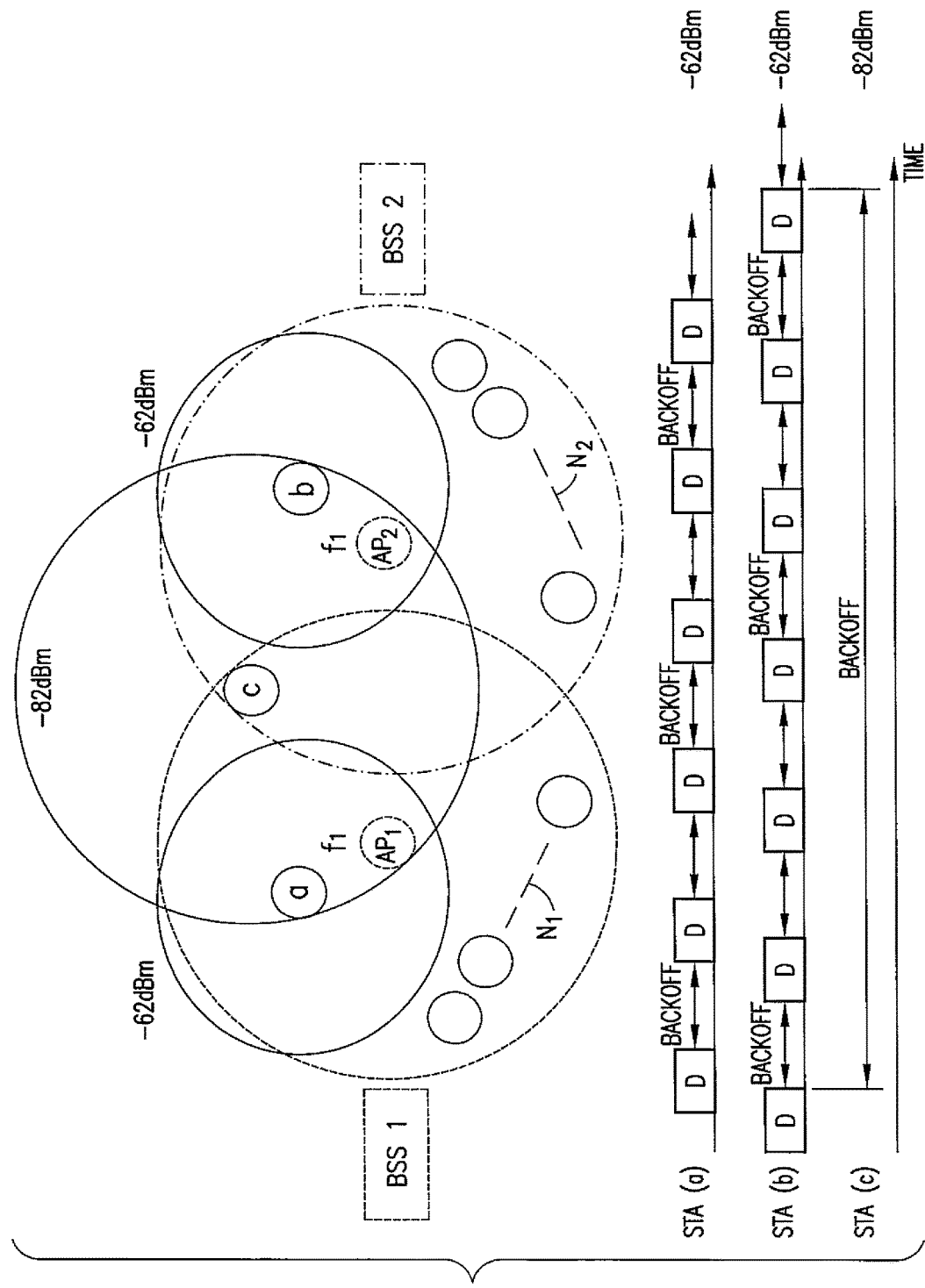
FIG. 1 illustrates a radio environment with two APs showing unfairness in channel access opportunities among different STAs using different CCA thresholds when trying to access the radio channel, which certain embodiments of these teachings address.

FIG. 1 illustrates a problem in allowing adaptive CCA thresholds, namely higher thresholds for STAs with a higher RSSI gives those stations a substantially better chance than STAs without an increased threshold in actually obtaining access to the channel. Extending the current WLAN protocols with adjustable CCA thresholds gives the STAs with the higher threshold more opportunities to transmit, and so if a system is to use CSMA/CA with adjustable CCA thresholds more needs to be done to ensure fairness among the different categories of users/STAs. Particularly in WLAN where the spectrum is unlicensed (or otherwise license-exempt) but also in other protocols for distributed contention of users' access to a licensed-spectrum channel, it is important that all comers/users have a relatively equal statistical opportunity to gain access to that radio channel.

The FIG. 1 example shows that unfairness in the channel access exists between STAs who apply different CCA threshold values. There are two BSSs overlapping in the same geographic area and using the same radio channel in FIG. 1. Each $i^{th}$ BSS consists of $AP_i$ and $N_i$ Wi-Fi STAs. Assume that STAs a and b are communicating with $AP_1$ and $AP_2$, respectively on channel $f_i$; they listened to the beacons associated with their corresponding APs; and raised their CCA thresholds to −62 dBm from the minimum −82 dBm due to their high measured RSSIs. Assume further that STA c belongs to BSS 1 and is using the minimum CCA threshold of −82 dBm due to its lower measured RSSI (or due to STA c being a legacy STA without the capability of adapting its CCA threshold based on RSSI). Each STA applies the CSMA/CA protocol to communicate on the $f_1$ channel.

FIG. 1 shows that STA c has a lower chance of using channel $f_1$ as compared to STA a which is also in BSS 1, as well as compared to STA b which is in overlapping BSS 2. To better illustrate the disparity the timeline at the lower portion of FIG. 1 reflects the channel is always idle and so each "D" represents a transmission by the respective STA, and each time STA a or STA b transmits then STA c must continue with its backoff timing before checking the channel again to transmit. Note that in some other examples STA c could find a transmit opportunity (i.e., find that the channel is not occupied) occasionally because the STA keeps pausing its backoff counter when activity is sensed and running its backoff counter when no activity is sensed, rather than re-initializing its backoff counter each time it senses the channel is busy. But even so STA c is at a significant statistical disadvantage if other STAs using other than the minimum CCA threshold are also looking for an opportunity to transmit.

Embodiments of these teachings targets the above fairness issue where some STAs are using a lower CCA threshold than some other STAs, which as outlined above may in future WLAN systems be due to the CCA thresholds being adaptable per STA based on the specific radio conditions seen by the individual STAs. As will be seen from the non-limiting examples, one effect of employing certain of these teachings is to rectify the unfairness of STAs with lower CCA thresholds having a reduced probability of using the spectrum/accessing the channel as compared to other STAs operating with higher CCA thresholds.

While the examples below are in the context of a WLAN system and use terminology (AP, STA, etc.) relevant for WLAN, the principles detailed herein are not limited only to WLAN systems or even to wireless radio systems that utilize only unlicensed radio spectrum. As such, the described AP can be embodied in other deployments of these teachings as a NodeB, e-NodeB, base transceiver station or the like and more generally characterized as a radio access node; and the described STA can be embodied in other deployments of these teachings as a user equipment (UE) embodied as a smart-phone (which may be handheld, wearable or implantable in whole or in part) or a machine-to-machine (M2M) communication device or the like which may be more generally characterized as a mobile radio node.

Specifically, certain embodiments address the above unfairness issue by providing that STAs with CCA threshold values higher than −82 dBm (to use a non-limiting example of the minimum or default CCA threshold) shall monitor their spectrum usage. If a STA has been using the spectrum extensively, then in one embodiment it shall backoff and check whether unfairness exists or not by executing the steps detailed in the example algorithm below. The backoff interval may in some embodiments depend on the CCA threshold the STA is currently using so there would be different backoffs for the minimum/default CCA threshold versus an adapted/higher CCA threshold. If unfairness exists, which in the algorithm below is when the STA adjudges that some (other) STA or STAs were blocked from using the channel, the subject STA shall allow these blocked STAs more probable access of the medium for a given duration. This reduces the variance of the probability of different CCA threshold users using the spectrum. One aspect of this approach is that it can include a new backoff mechanism (the CCA threshold backoff) for systems with adaptive CCA thresholds to ensure fairness between STAs, and can thus address the fairness issue while still enabling the higher throughputs that the general concept of adaptive CCA thresholds is intended to advance.

In general, for this embodiment the STA using a higher CCA threshold decreases temporarily the CCA threshold to a lower value, if the STA has been able to use the spectrum well enough according to some criteria. The criteria could be based on an average deferring time experienced by the STA when compared to some threshold, or based on a number of successful transmissions per time period as compared against some threshold, or simply on a periodical timer to name a few non-limiting examples. All of these specific examples are detailed with particularity below.

Certain aspects of these teachings may be implemented by an algorithm stored in the local memory of the STAs and/or of the APs utilizing these teachings. While there are many possible algorithms to implement some or all of these teachings, below is one non-limiting example of a DCF algorithm to implement certain embodiments of these teachings. In this example, −82 dBm is used as a non-limiting example of the default or minimum CCA threshold; the index j refers to a given STA, and the index i refers to a given BSS. These indices are positive integers.

```
1  For each STA j (wishes to transmit) in BSS i, j={1, 2, 3, ...Nj}, calculate γj according to
   the beacon's RSSI
2     If γj > −82 dBm
3         Calculate the number of successful transmission attempts in a time period T,
          Mj(T)
4         If Mj(T) ≥ M* .
5             Decrease CCA threshold to −82 dBm
6             Increase the contention window by a constant C
7             Backoff (even if medium is free)
8             If another STA transmits before the end of the backoff (unfairness exists)
9                 • Start time counter td
10                • Backoff count down freezes (remaining time used in next
                    transmission attempt)
11                • Wait for IFS → Transmit if channel is still free
12                While td≤td*
13                    Apply traditional CSMA/CA protocol while fixing γj = −82 dBm
14                End while
15                • Reset Mj(T)=0 and reset td=0
16            Else if no STA transmits before the end of the backoff (unfairness did not
              exist)
17                • Wait for IFS → Transmit if channel is still free
18                • Reset Mj(T)=0
              End if
19        Else
20            Apply traditional CSMA/CA protocol (with the new calculated γj > −82
              dBm)
21        End if
22    Else
23        Apply traditional CSMA/CA protocol
24    End if
25 End for
```

The parameters of the above modified DCF algorithm are defined as follows:
- $\gamma_j$: CCA threshold of STA j (e.g., Range: −82 dBm to −50 dBm)
- $M_j^{(T)}$: Number of successful transmissions contentions in a time Period T given saturation traffic
- $M^*$: A threshold value on $M_j^{(T)}$ (e.g., Range: 10 to 100)
- $t_d$: Time elapsed since STA decreases its CCA threshold
- $t_d^*$: Threshold value for $t_d$ (e.g., 1 ms to 0.5 s)
- C: Constant (Contention window range: e.g., 15 to 1024 slots)

The above algorithm can be applied by STAs who can adapt their CCA thresholds (for example, high efficiency STAs in 802.11ax systems). In this example a STA j that wishes to transmit UL messages would have to first calculate the optimal values for its CCA threshold $\gamma_j$ (e.g., this calculation can use the RSSI value from a received Beacon broadcast by the AP). If $\gamma_j$=−82 dBm, which is the minimum value in this example, then the STA shall use the conventional (e.g., traditional or prior art) CSMA/CA protocol. Otherwise (i.e., when $\gamma_j$>−82 dBm), the STA shall calculate the number of successful transmission attempts $M_j^{(T)}$ in a time period T. Different fairness criteria can be used in other embodiments, as mentioned above. If $M_j^{(T)}$<M*, this means that the STA was not aggressively using the spectrum, and according to the above example algorithm the STA shall continue using the CSMA/CA protocol, but with the new CCA threshold ($\gamma_j > -82$ dBm).

On the other hand, if $M_j^{(T)} \geq M^*$, unfairness may or may not exist depending on whether or not other STAs (e.g., those utilizing lower CCA thresholds) have been deferred from using the radio channel/medium. In this case, the STA implementing the above algorithm executes the following CCA threshold backoff steps.

A. The STA decreases its CCA threshold to the minimum value (i.e., −82 dBm) and backs off even if the medium was sensed free. The STA does this while increasing its maximum value for the contention window interval by a value C to check whether unfairness exists or not.

B. If no activity is detected until the end of the backoff interval (as shown by example at FIG. 2), this means that no other STAs were waiting to access the medium and the conclusion is that unfairness did not exist. STA j may wait for an interframe spacing (IFS specified by the relevant radio protocols, for example 9 µs); transmit if channel is still free or apply the conventional backoff if the channel is busy, and reset its counter $M_j^{(T)}$.

C. If instead some activity is detected before the end of the backoff interval, then the conclusion is that unfairness may have existed (as shown by example at FIG. 3). In this case STA j may start a counter $t_d$ which counts the time from where the STA reduces its CCA threshold value; and pauses its backoff count down (i.e., apply the conventional CSMA/CA with the minimum/default −82 dBm CCA threshold for a duration of $t_d^*$). Once this threshold time passes, the STA j can then reset both counters $M_j^{(T)}$ and $t_d$.

In another embodiment of these teachings, if $M_j^{(T)} \geq M^*$ (or some other usage criteria is satisfied) the STA executes the following CCA threshold backoff "alternative" step. The STA decreases its CCA threshold, e.g., to the minimum value (−82 dBm in these examples), and backs off even if the medium was sensed free while using the normal contention window to check whether unfairness exists or not. This embodiment is the equivalent of setting the value of C=0 at line 6 of the above algorithm, since the contention window size does not change there.

Figure 2:
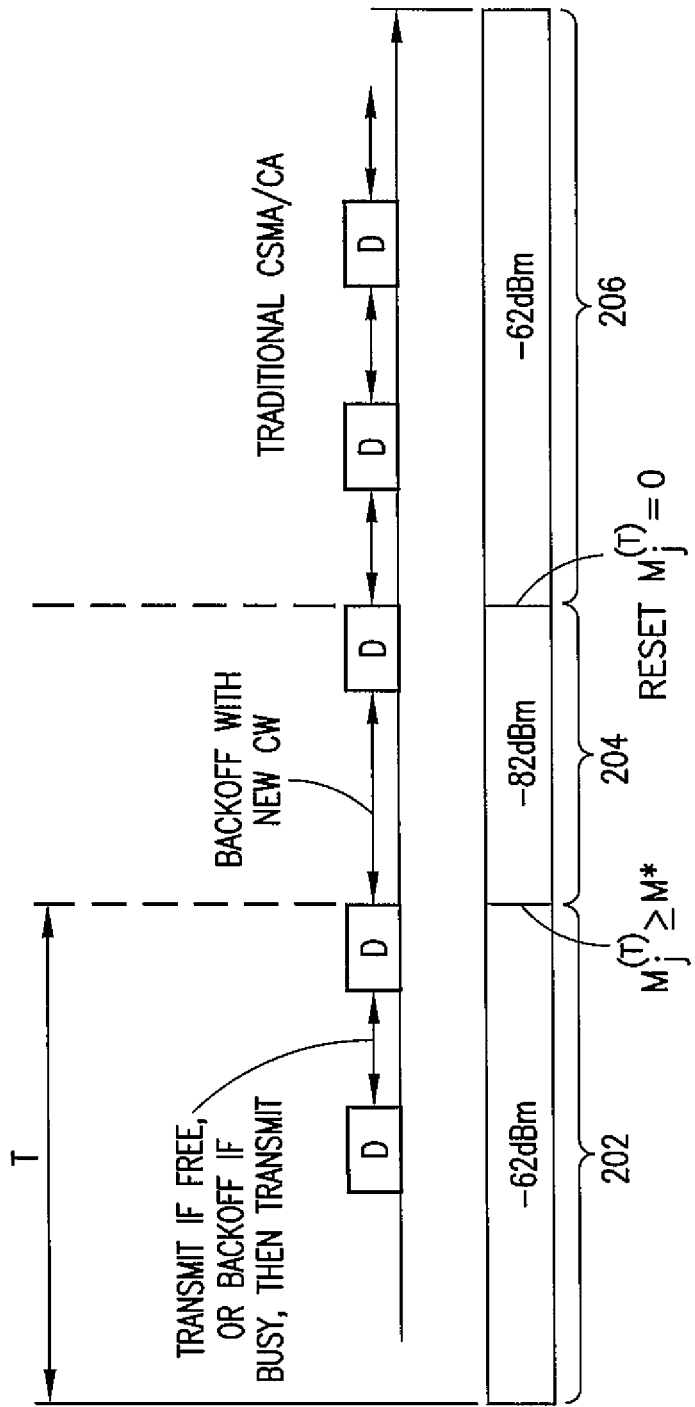
FIG. 2 is a schematic diagram illustrating a first instance in which a STA practicing embodiments of these teachings determines the channel is free and thus assesses that there is no unfairness in accessing the channel.
Figure 3:
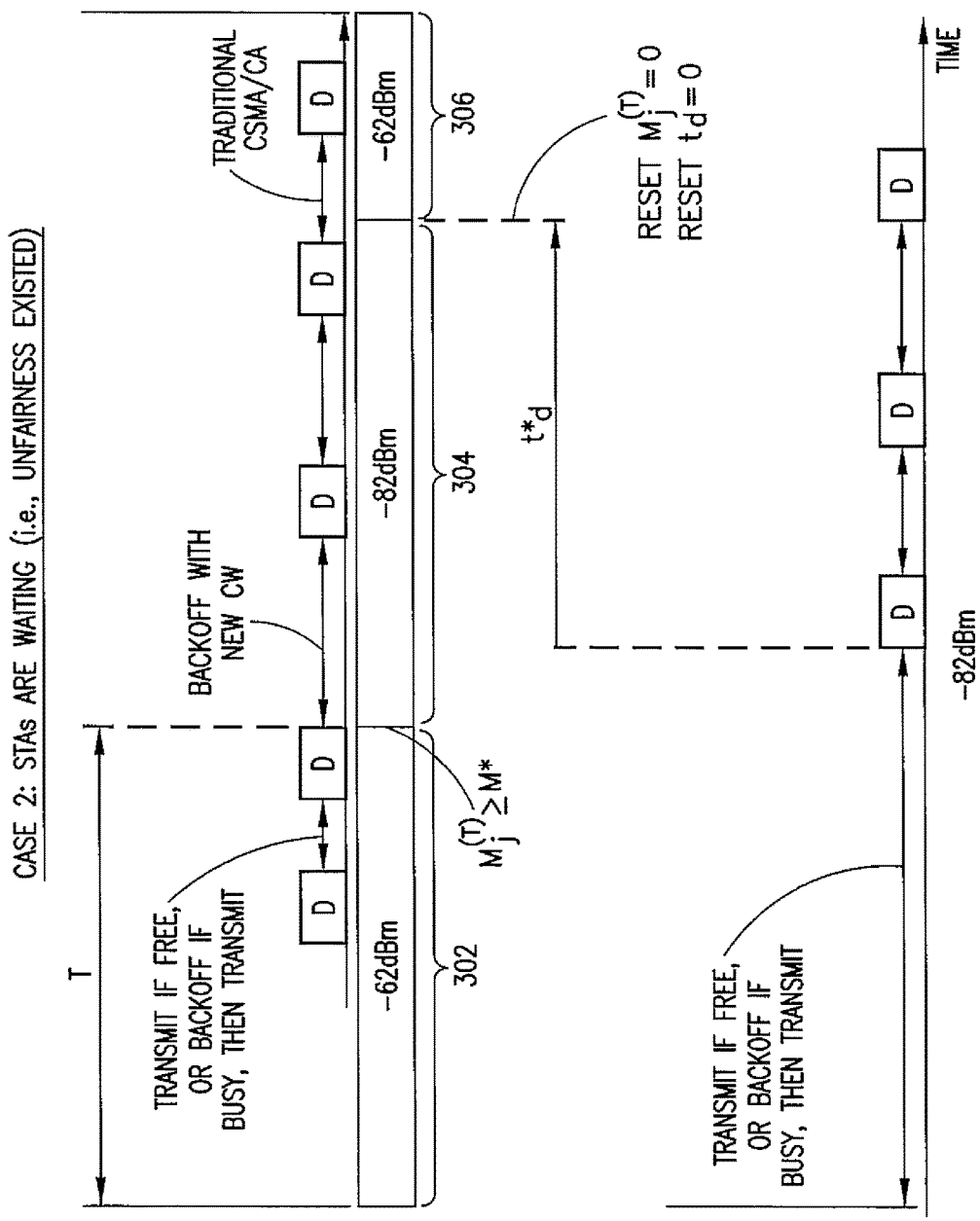
FIG. 3 is a schematic diagram illustrating a second instance in which a STA practicing embodiments of these teachings determines the channel is not free and thus assesses that there could be unfairness in accessing the channel.

Consider the case illustrated at FIG. 2 in which the STA senses that there is no unfairness in the radio channel access. Assume for this example that the minimum CCA threshold as −82 dBm and that the STA has only just joined the AP's network or has been inactive for a time prior to what FIG. 2 shows and so its spectrum usage counter $M_j^{(T)}$ is initially reset to zero. Transmission events in FIGS. 2-3 are indicated by a capital D. The STA running the above algorithm at FIG. 2 uses adaptive CCA thresholds and sets γ=−62 dBm initially. Consider this value as a first CCA threshold, greater than the minimum −82 dBm. Having that higher threshold and no previous spectrum usage the STA is able to access the channel fairly often during the initial/first time period 202 while it is using the first CCA threshold for its clear channel assessment of the relevant spectrum/channel. In this case, the algorithm skips from line 4 where the STA using the second CCA threshold (set to −82 dBm) has not utilized the spectrum more than the threshold usage level to lines 22-23 where it uses the traditional CMSA/CA protocol using that second CCA threshold to assess whether or not the channel is free.

In an embodiment, the STA re-runs the algorithm each time it wants or needs to check whether unfairness exists in the channel. This initial period 202 ends once the STA sees at line 4 of the algorithm that it has occupied the spectrum/channel more than the threshold usage level, and per line 5 of that algorithm it decreases its CCA threshold from −62 dBm to −82 dBm at the start of the second time period 204 of FIG. 2.

While the algorithm at line 5 and the examples herein use the minimum CCA threshold −82 dBm as the value after this reduction, in other embodiments the reduction from the first CCA threshold need not be all the way down to the minimum and so this value that the STA uses during the second time period 204 may be referred to as a second CCA threshold, which may be the minimum CCA threshold or higher so long as it is less than the first CCA threshold at line 2 of the algorithm and in the first time period 202 of FIG. 2.

Figure 6:
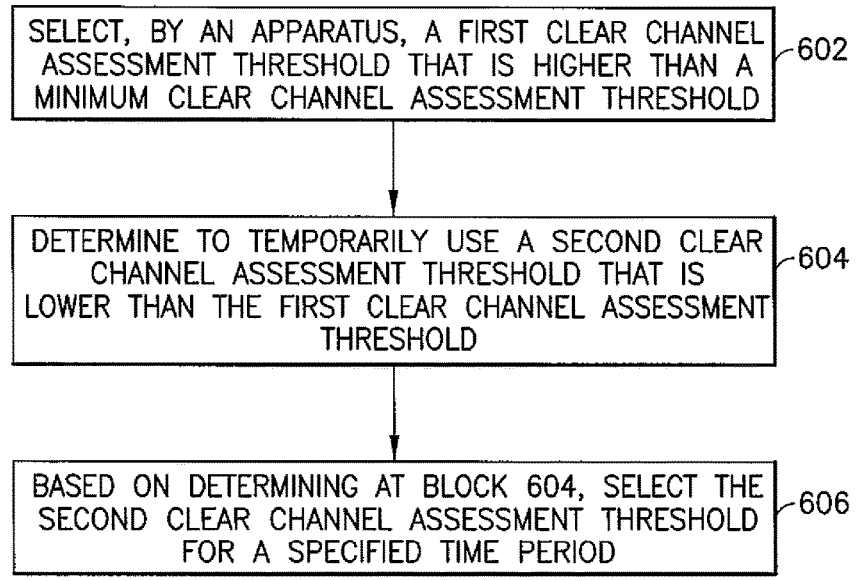
FIG. 6 is a process flow diagram illustrating certain embodiments of these teachings from the perspective of a STA.

FIG. 2 summarizes that during this second time period 204 the STA backs off with a new contention window, which represents lines 6-7 of the above algorithm. Since FIG. 2 illustrates the example in which the STA finds the channel is free it does NOT sense another STA transmitting on the channel at the end of its backoff period and so the IF condition at line 8 of the algorithm is not satisfied; instead the algorithm skips the STA to line 16 (unfairness does not exist) and the STA transmits if the channel is still free after waiting an interframe space (IFS). Line 18 of the algorithm is shown at FIG. 2 where the STA resets its spectrum usage counter $M_j^{(T)}$. As seen in FIG. 6 below there is a specified time period during which the STA selects the second CCA threshold, and in the FIG. 2 example this specified time period is the second time period 204 that includes the backoff as well as the STA's transmission D (since in the FIG. 2 example the channel was adjudged to be clear).

With this resetting the algorithm begins again at the start/line 1 when the STA is operating in the third time period 206 of FIG. 2. Assume the STA again calculates at line 1 of the algorithm that its CCA threshold γ should be −62 dBm. Since its spectrum usage counter $M_j^{(T)}$ is reset to zero, the algorithm again skips the STA from line 4 to lines 19-20 where it uses the traditional CMSA/CA protocol but with its newly calculated CCA threshold to assess whether or not the channel is free.

Now consider the case illustrated at FIG. 3 in which the STA senses that there is unfairness in the radio channel access. The timeline at the lower portion of FIG. 3 represents a STA which is the one that the STA represented by the upper timeline senses when it finds the channel to be busy and unfairly used/accessed. FIG. 3 uses the same assumptions as above for FIG. 2, and during the first period 302 of FIG. 3 the algorithm results are the same for this STA as they were for the first period 202 of FIG. 2.

In FIG. 3, once the STA's usage of the channel exceeds the spectrum usage threshold it enters the second time period 304 using the second CCA threshold (−82 dBm for this example but it could be higher so long as it is less than the first CCA threshold −62 dBm in this example). During the second time period 304 the STA also applies a backoff/specified time period and an increased contention window (CW). At the start of the second time period 304 the STA senses the channel is occupied (this occurs at the vertical dashed line which is the start of a transmission by the STA represented at the lower timeline) which satisfies the "IF" condition at line 8 of the algorithm. This is the unfairness that the STA determines exists, the assumption being that the other STA did not have a fair opportunity to access the channel earlier when the STA was using the higher −62 first CCA threshold. The algorithm then has the STA start a new time counter $t_d$, and pauses/freezes/suspends its different backoff timer that tracks the backoff time/specified time period per lines 9-10 of the above algorithm. The STA at the top of FIG. 3 does find the channel clear on two occasions after waiting an IFS and so two transmissions are shown. The second time period 304 ends when the WHILE condition at line 12 of the algorithm is no longer satisfied once the time counter $t_d$ expires.

At the start of the third time period 306 of FIG. 3 the STA's spectrum utilization counter and time counter are reset to zero, and it calculates its CCA threshold as −62 dBm which is the first CCA threshold. The third time period 306 of FIG. 3 has the algorithm yielding the same results as for the third time period 206 of FIG. 2.

Figure 4:
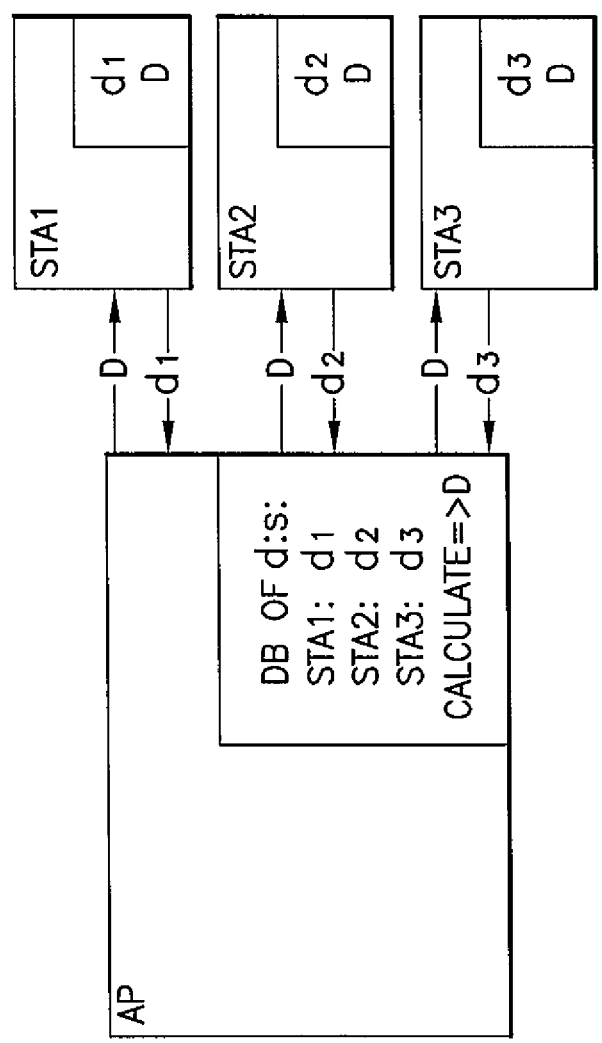
FIG. 4 is a high level schematic diagram of STAs and an AP practicing an aspect of these teachings in which individual STAs report their own defer times and the AP broadcasts a target defer time which the STAs use to set their clear channel assessment threshold.

In the above embodiments it was assumed that the STA calculates its adaptive CCA threshold based on the RSSI it measured from the AP's transmissions. In certain other embodiments the STA can trigger to set its adaptive CCA threshold based on a defer time as detailed below with respect to FIG. 4. This is another way to measure fairness in the cell. In this embodiment each $i^{th}$ STA has a defer time $d_i$ (i.e. the time STA i is experiencing channel busy and cannot transmit for that reason) that is particular for that individual STA. The individual STAs themselves can measure and track this, and store it in their local memory. The defer time d is the number of times the STA has experienced the channel/.spectrum being busy over some predetermined time interval, which may be standardized for all STAs or broadcast by the AP so all STAs in a given cell can use the same predetermined time interval. Each STA will frequently report their d to the AP, for example at specified intervals or anytime the value of d has changed more than some minimum threshold change. The AP will store in its own local memory a database (DB in FIG. 4) containing the variously reported d values from some STAs associated with the AP as shown in FIG. 4, and it can then calculate a target defer time D using those individual d values stored in its database (using some validity window to cull the older reported values of d from the database). The AP can then signal this D value, for example within the beacon or system information it broadcasts in the cell, to the STAs that have reported values for their individual defer times d. For example, the AP may calculate the value D as an average or median over all the d values in the database. Each of these affected STAs, which typically will be those STAs that are both active and capable of using adaptive CCA thresholds, uses the value D as a target value when changing between CCA threshold default value (=−82 dBm in these examples) and any of the adaptive CCA threshold values (those >−82 dBm in these examples).

This defer time embodiment enables a more aggressive spatial reuse as follows:
If (d>D), then set CCA threshold >−82 dBm (e.g. −62 dBm);
Else set CCA threshold as default/minimum −82 dBm In the defer time decision above, certain embodiments can apply hysteresis to avoid fluctuation in that 2-line decision. This means that a STA could compare its value d to the value D+M (instead of D) where M is a value (in seconds for example) and may be derived from the d distribution by the AP and signaled to the STAs. So for example, the value for M could be derived from a standard deviation of the d distribution such as M=a×σ, where σ is the standard deviation and a is a constant such as one. In this embodiment the AP can signal the values for M and D, or it can signal a single value D+M in which case the individual STAs will not be aware of the values of D or M individually, only their sum.

In another embodiment using the defer times, an individual STA may get a penalty if its defer time has been too short as compared to the network average or median or however the target defer time D is calculated. This penalty may be a fixed time when the STA needs to delay its contention, and/or it may be an increase of the value of CWMax (the maximum contention window interval) for some fixed period of time. This embodiment would benefit from the AP signaling two thresholds to the STAs, one that would give a threshold for the penalty (e.g., how much below D that STA's d must be for the penalty to be imposed) and one for changing the CCA threshold (D as detailed above). This embodiment is illustrated by the state machine of FIG. 5A (executed by a given STA) and the fairness chart of FIG. 5B.

The given STA measures its defer time d and compares it to values $F_1$ and $F_2$, where $F_1$ is the threshold difference between d and D which triggers imposition of the penalty which in the above example is the increased CWMax and $F_2$ is the target defer time D in the above example. So for example the value of $F_1$ may be one standard deviation below the value of $F_2$. As shown in text there, FIG. 5B assumes the STA's use of the channel/spectrum is highly unfair if the STA's d is less than $F_1$; simply unfair if the STA's d is between $F_1$ and $F_2$; and fair if the STA's d is less than $F_2$.

Figure 5A:
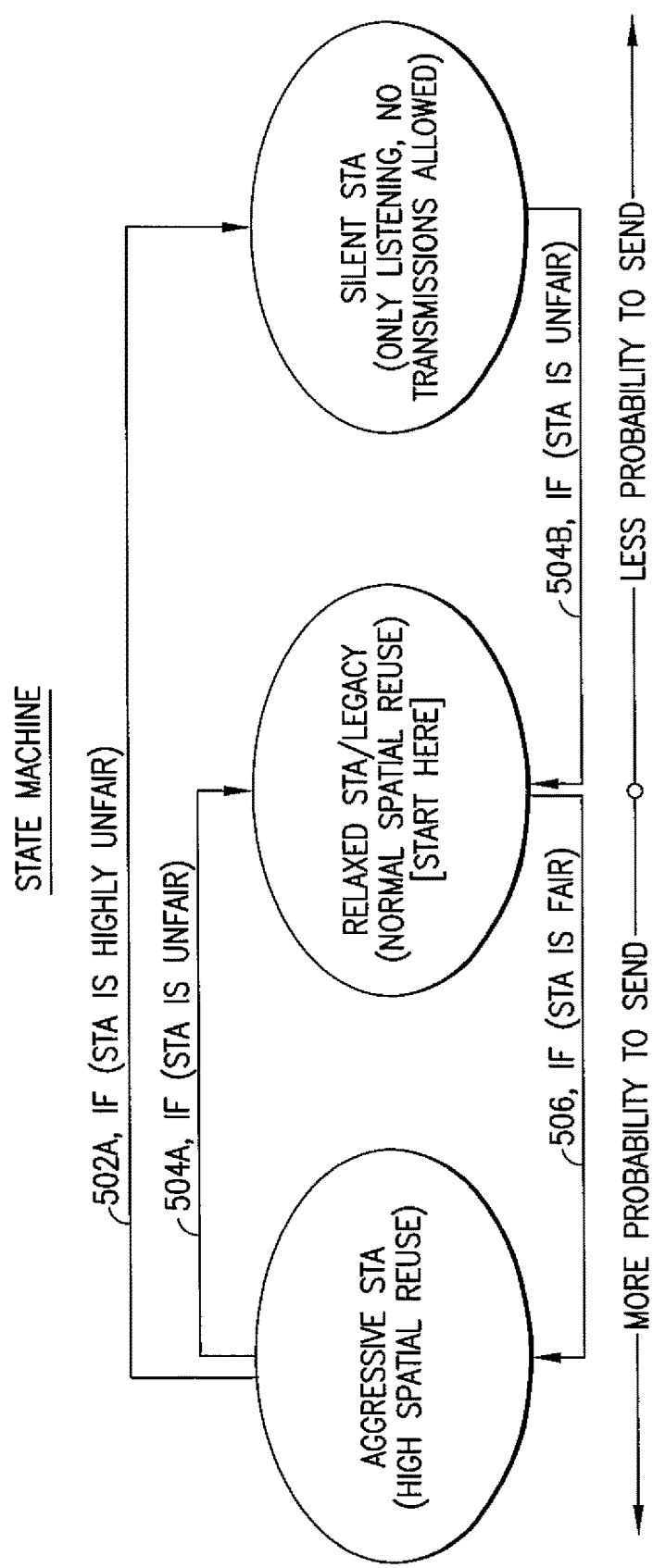
FIG. 5A is a schematic diagram of a state machine for a STA operating according to these teachings that would ensure fairness in accessing a channel. (Upper figure) State machine (executed by a STA) that would ensure fairness (equal opportunity for transmissions) in the BSS.

When there is high spatial reuse of the spectrum and a STA is aggressively using it in the FIG. 5A state machine, the algorithms implementing these teachings will move 502A a STA that is highly unfair (within section 502 of FIG. 5B) to essentially a silent STA at the right of FIG. 5A during which that STA only listens/sleeps and does not transmit. If instead that same STA's aggressive use of the spectrum is deemed to be simply unfair (region 504 of FIG. 5B), the algorithms will move 504A that same STA to a normal spatial reuse at the center of the state machine shown at FIG. 5A.

If the STA has been silent and spectrum usage is considered simply unfair (by another STA, not the one running the state machine of FIG. 5A), then the STA running the FIG. 5A state machine will move 504B also to the center state of the FIG. 5A state machine where spectrum reuse is considered in the normal range, but this time from the right side of FIG. 5A.

A STA in the normal spectrum usage range at the center of the FIG. 5A state machine (and in region 506 of FIG. 5B) may want to more aggressively utilize the spectrum, such as by adapting its CCA threshold to be higher than the minimum. This moves 506 the state of the STA from the center of FIG. 5A to the left side, and if there are other STAs not also trying to aggressively use the spectrum with an increased CCA threshold it will likely happen that this STA will eventually cause some unfairness in the spectrum usage that embodiments of these teachings address.

Figure 5B:
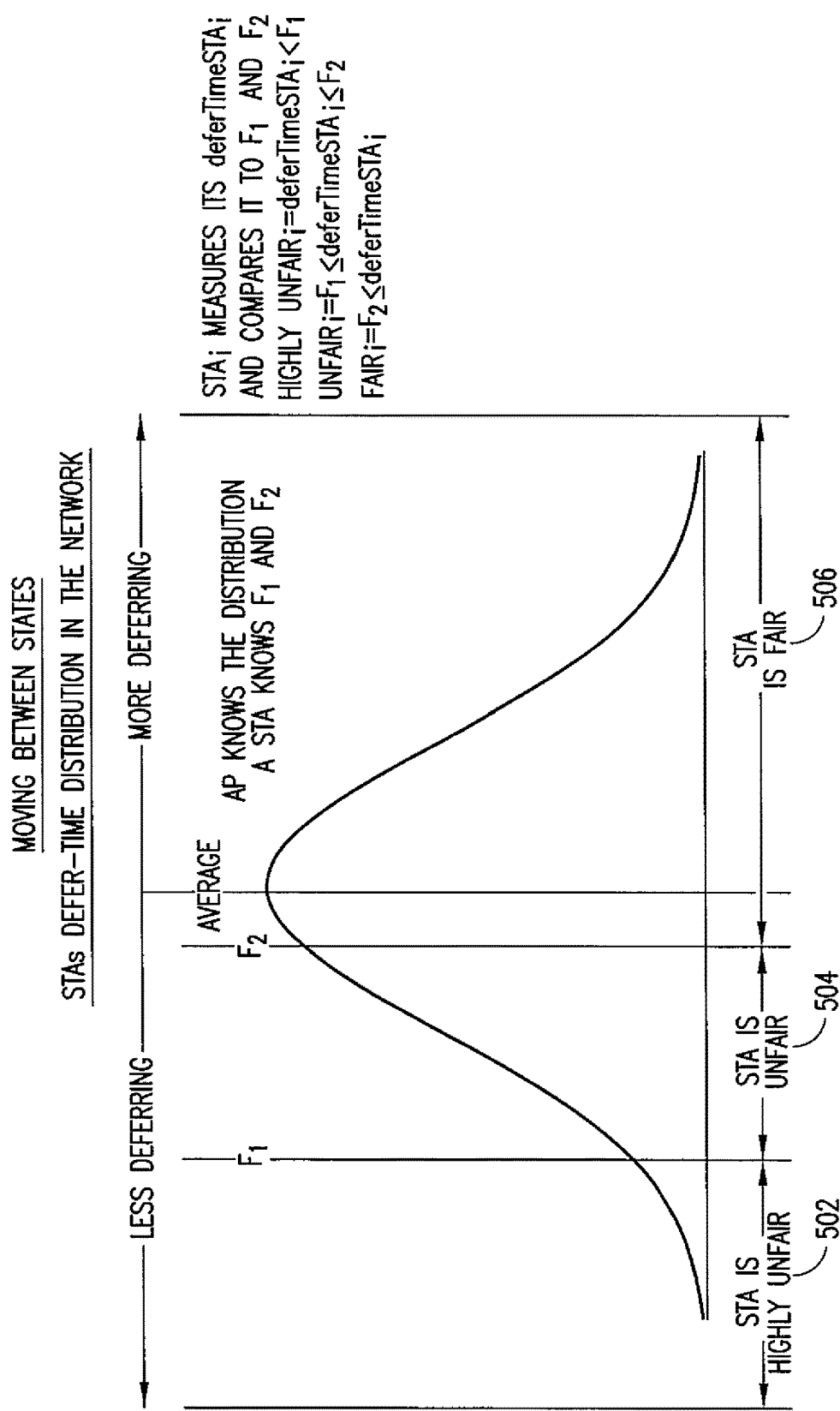
FIG. 5B is a data plot showing how moving between the state of the state machine of FIG. 5A ensures fairness in the various STAs accessing the channel.

The AP can have knowledge of the distribution shown at FIG. 5 and adjust the values for $F_1$ and $F_2$ accordingly to ensure any unfairness that arises remains within controlled boundaries. Adjusting these values essentially moves the average and the height/breadth of the bell curve distribution shown in FIG. 5B. FIG. 5B is only an example and it is expected that typical traffic conditions may not yield a Gaussian curve.

In another embodiment of these teachings, if $M_j^{(T)} \geq M^*$ (or some other test that indicates the STA has been utilizing the spectrum more than some threshold) the STA decreases its CCA threshold, e.g., to the minimum value (i.e., −82 dBm) or some other reduced value, and uses that minimum reduced CCA threshold according to a periodic timer. For example, if the timer runs a total of 10 seconds, in this embodiment the STA would use the reduced CCA threshold for 2 seconds and the higher CCA threshold for the remaining 8 seconds. In one variation this embodiment can be implemented even without the STA checking its spectrum usage level, for example anytime it calculates its CCA threshold to be above some limit (and this limit may be the minimum CCA threshold), the STA will use its calculated CCA threshold for one interval of the periodic timer and a reduced CCA value for the remaining interval of the periodic timer. After that periodic timer expires the STA will gain calculate its CCA threshold, and if it is above the limit the STA will again use the periodic timer. In one embodiment the STA can learn the length of the periodic timer and one or both of the intervals via a broadcast message from the AP (e.g., system information, beacon), which enables the AP to tailor the interval based on traffic and how many STAs are active. In another embodiment the interval lengths and/or the periodic timer length is fixed by being standardized in a published radio access protocol. Any of these embodiments have the advantage that they are much simpler than the example algorithm above.

From the above examples and explanations it is clear that embodiments of these teachings provide the technical effect of maintaining fairness between STAs that are using different CCA thresholds in a BSS (or in a cell for other non-WLAN types of radio networks), which is anticipated to be the case at least for next generation WLAN protocols such as IEEE 802.11 ax. One particularly effective way these teachings do so is by the CCA threshold backoff/specified time period, or by the periodic timer in other embodiments. A particular advantage is that certain embodiments of these teachings can be implemented by software only and so may be practiced by legacy STAs that are not suitable for hardware upgrades.

FIG. 6 is a process flow diagram illustrating at a high level certain embodiments of the above teachings, and read from the perspective of a given STA or other mobile radio device practicing the invention, termed more generally as an apparatus which may be the entire STA/mobile radio device or one or more components therefor. At block 602 the apparatus selects a first clear channel assessment threshold that is higher than a minimum clear channel assessment threshold; this occurs at lines 1-2 of the example algorithm above. Then at block 604 the apparatus determines to temporarily use a second clear channel assessment threshold that is lower than the first clear channel assessment threshold; and in the algorithm above this is represented at line 5 as the reduced CCA threshold which may or may not be the same as the minimum CCA threshold. And finally in FIG. 6, based on determining at block 604 the apparatus selects the second CCA threshold for a specified time period, which in the algorithm includes the backoff period at line 7 and which may be adjusted by the time counter $t_d$.

In some embodiments, determining to temporarily use the second clear channel assessment threshold as in block 604 can be based on the apparatus' use of a spectrum relative to threshold usage level. This spectrum usage may be calculated over a predefined time period, and above were detailed two non-limiting example how this calculation can be done; namely a number of successful transmissions by the apparatus on the spectrum over a predefined time period, and a deferring time experienced by the apparatus with respect to the spectrum over a predefined time period. For the deferring time example, the apparatus may track its deferring time as an amount of time over the predefined time period during which the apparatus experienced the spectrum to be busy; transmit the tracked deferring time to the AP or other radio access node; receive from the AP/radio access node a target deferring time, and compare the tracked deferring time with the target deferring time.

With respect to the example algorithm above, the specified time period at block 606 comprises a backoff time during which the apparatus is prohibited from transmitting on a spectrum, and in that example algorithm that prohibition applies regardless of whether or not the apparatus senses the spectrum to be clear with respect to the second clear channel assessment threshold (that is, while performing its CCA using the second CCA threshold). The purpose of the backoff time is to sense the medium for unfairness, for example it may be that certain legacy STAs might not get service at all. If unfairness is detected, the STA would continue with the second CCA threshold for a time (e.g., based on a timer). If not, the STA may change its CCA threshold back to more aggressive mode, but not start the timer. The example algorithm would prohibit the STA from transmitting data if the STA has data to transmit when a "special time period" starts and the medium is free; in conventional ELAN CSMA/CA the STA would transmit its data but in the example algorithm the STA would instead start its backoff time.

Further in that same embodiment using the example algorithm, if the apparatus senses the spectrum to be not clear with respect to the second clear channel assessment threshold during the backoff time, the apparatus will initiate a time counter $t_d$ and transmit on the spectrum if the apparatus senses the spectrum to again be free with respect to the minimum clear channel assessment threshold at expiry of the time counter; else if the apparatus senses the spectrum to be clear during the backoff time and if the apparatus senses the spectrum to be clear with respect to the second clear channel assessment threshold after the backoff time during the specified time period, the apparatus can transmit on the spectrum without regard to the time counter. In both instances the apparatus may need to wait an IFS before transmitting.

With respect to the periodic timer embodiment described above, the second clear channel assessment threshold is temporarily used at block 604 of FIG. 6 when such use is triggered by a periodic timer. Specifically in the above periodic timer examples, the second clear channel assessment threshold is used during one interval of the periodic timer which may be considered the specified time period of block 606, and the first clear channel assessment threshold may be used during a second interval of the periodic timer. In these embodiments at least one of the first interval and the second interval may be either specified in a radio access technology specification, or received by the apparatus in a broadcast message. The length of the overall periodic timer may also be specified in a wireless protocol or broadcast by the AP.

FIG. 6 has a specified time period at block 606 which is implemented differently in the various examples above. A further advantage may be obtained from these teachings by having that specified time period, however defined, synchronized across some or all of the STAs that are active and operating in a BSS. This would enable the STAs to start checking the channel for unfairness all at the same time. In one embodiment this synchronization may be standardized, such as a certain number of subframes from the AP's beacon or some start point derived from the beacon by a published calculation, or in another embodiment the AP can control the synchronization directly by broadcasting an indication of the time period start time.

One advantage in synchronizing the start of the specified time periods for all of the STAs in a BSS that are using high CCA threshold (e.g., >−82 dBm) is to ensure their assessment of fairness is consistent. For example, assume that STA 1 is using a high CCA threshold value (e.g., −62 dBm). At a certain time instant, STA 1 finds that its spectrum usage is very high (i.e., it is a greedy STA), then it reduces it CCA threshold to −82 dBm to check whether unfairness exists Or not (i.e., starts its specified time period). Assume that at this time instant, STA 2 (CCA threshold=−62 dBm) starts using the spectrum. STA 1 thought that unfairness existed as it hears the STA 2 transmission. However, this is a false positive situation. To solve this problem, synchronization could be done between different STAs. For example, all STAs (with high CCA threshold) could reduce their CCA threshold to −82 dBm at the same time (by listening to AP beacon for example). In this case, any activity detected during the specified time period will correctly reflect whether unfairness exists or not as only STAs with low CCA thresholds (−82 dBm) will be able to access the spectrum during the specified time period.

Embodiments of these teachings may be practiced by an apparatus that includes at least one processor and at least one non-transitory memory including computer program code, in which the at least one memory and the computer program code are configured, with the at least one processor, to cause the apparatus to perform the process set forth at FIG. 6 and as further detailed above.

Embodiments of these teachings may be practiced by a computer readable memory that tangibly stores computer program code that when executed by at least one processor of an apparatus causes the apparatus to perform the process set forth at FIG. 6 and as further detailed above.

Figure 7:
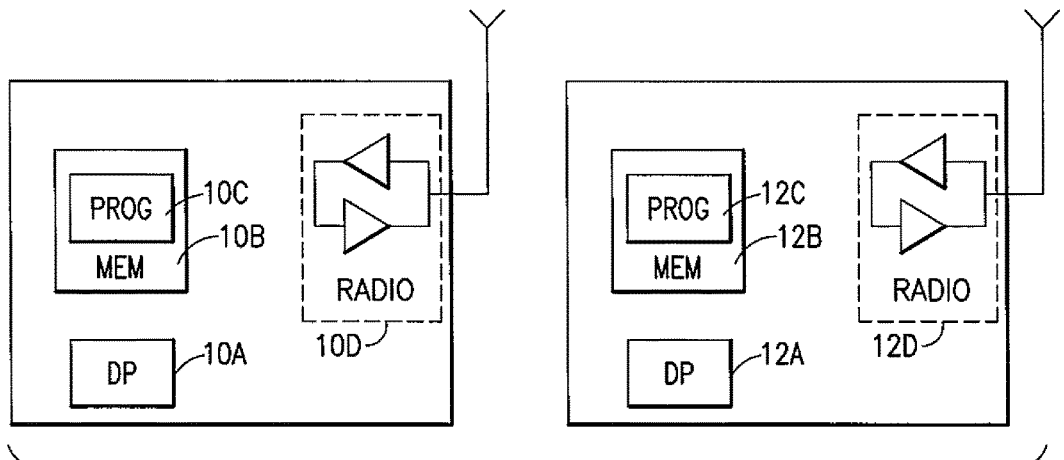
FIG. 7 is a high level schematic block diagram illustrating exemplary devices/apparatuses that may implement these teachings.

FIG. 7 is a high level block diagram illustrating certain exemplary devices/apparatuses that may embody or otherwise practice the invention. While they are specifically shown as a STA 10 and an AP 12, in more general terms the STA 10 can be any mobile radio device and the AP 12 can be any radio network access node.

The STA 10 includes a controller, such as a computer or a data processor (DP) 10A, a computer-readable memory medium embodied as a memory (MEM) 10B that stores a program of computer instructions or otherwise computer program code (PROG) 10C, and a suitable wireless interface, such as radio 10D including a radio frequency (RF) transmitter and receiver and associated RF circuitry, for bidirectional wireless communications with the AP 12 via one or more antennas.

The AP 12 also includes a controller, such as a computer or a data processor (DP) 12A, a computer-readable memory medium embodied as a memory (MEM) 12B that stores a program of computer instructions or otherwise computer program code (PROG) 12C, and a suitable wireless interface, such as a radio 12D that includes a RF transmitter and receiver and associated RF circuitry, for communication with the STA 10 via one or more antennas.

At least one of the PROGs 10C/12C is assumed to include program instructions that, when executed by the associated DP 10A/12A, enable the device to operate in accordance with exemplary embodiments of this invention, as detailed above. That is, various exemplary embodiments of this invention may be implemented at least in part by computer software executable by the DP 10A of the STA 10; and/or by the DP 12A of the AP 12, or by hardware, or by a combination of software and hardware (and firmware).

The STA 10 and the AP 12 may also include dedicated processors that may be constructed so as to operate in accordance with various exemplary embodiments of this invention.

The computer readable MEMs 10B/12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A/12A may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., radios 10D/12D) may be of any type suitable to the local technical environment and may be implemented using any suitable communication technology such as individual transmitters, receivers, transceivers or a combination of such components.

The following abbreviations that may be found in the specification and/or the drawing figures are defined as follows:
AP access point
BSS basis service set
CA collision avoidance
CCA clear channel assessment
CSMA carrier sense multiple access
DCF distributed coordination function
IEEE Institute for Electrical and Electronics Engineers
IFS interframe spacing
MAC media access control
STA station (non-AP)
OFDMA orthogonal frequency division multiple access
RSSI received signal strength indicator
UL uplink
WLAN wireless local area network (also known as Wi-Fi)

What is claimed is:

1. A method comprising:
selecting, by an apparatus, a first clear channel assessment threshold that is higher than a minimum clear channel assessment threshold;
tracking at the apparatus a deferring time that represents an amount of time over a predefined time period during which the apparatus experienced a spectrum to be busy;
transmitting to a radio access node the tracked deferring time;
receiving from the radio access node a target deferring time;
comparing the tracked deferring time with the target deferring time;
determining, based on the comparing, to temporarily use a second clear channel assessment threshold that is lower than the first clear channel assessment threshold; and
based on the determining, selecting and using the second clear channel assessment threshold for communication for a specified time period.

2. The method according to claim 1, wherein determining to temporarily use the second clear channel assessment threshold is based on the apparatus' use of the spectrum relative to threshold usage level.

3. The method according to claim 2, wherein the apparatus' use of the spectrum relative to the threshold usage level is calculated over a predefined time period.

4. The method according to claim 2, wherein the apparatus' use of the spectrum relative to the threshold usage level is calculated as:
a number of successful transmissions by the apparatus on the spectrum over a predefined time period.

5. The method according to claim 1, in which the specified time period comprises a backoff time during which the apparatus is prohibited from transmitting on the spectrum regardless of whether or not the apparatus senses the spectrum to be clear with respect to the second clear channel assessment threshold.

6. The method according to claim 5, the method further comprising:
if the apparatus senses the spectrum to be not clear with respect to the second clear channel assessment threshold during the backoff time, initiate a time counter and transmit on the spectrum if the apparatus senses the spectrum to again be free with respect to a minimum clear channel assessment threshold at expiry of the time counter;
else if the apparatus senses the spectrum to be clear during the backoff time and if the apparatus senses the spectrum to be clear with respect to the second clear channel assessment threshold after the backoff time during the specified time period, transmit on the spectrum.

7. The method according to claim 1, wherein determining to temporarily use a second clear channel assessment threshold is triggered by a periodic timer.

8. The method according to claim 7, wherein the second clear channel assessment threshold is used during one interval of the periodic timer and the first clear channel assessment threshold is used during a second interval of the periodic timer.

9. The method according to claim 8, wherein at least one of the first interval and the second interval is:
specified in a radio access technology specification; or
received by the apparatus in a broadcast message.

10. The method according to claim 1, in which a start of the specified time period is synchronized with that of other mobile radio devices in a cell or basic service set.

11. An apparatus comprising:
at least one processor; and
at least one non-transitory memory including computer program code, the at least one memory and the computer program code configured to, with the at least one processor, cause the apparatus to:
select a first clear channel assessment threshold that is higher than a minimum clear channel assessment threshold;
track at the apparatus a deferring time that represents an amount of time over a predefined time period during which the apparatus experienced a spectrum to be busy;
transmit to a radio access node the tracked deferring time;
receive from the radio access node a target deferring time;
compare the tracked deferring time with the target deferring time;
determine, based on the comparison, to temporarily use a second clear channel assessment threshold that is lower than the first clear channel assessment threshold; and
based on said determining, select and use the second clear channel assessment threshold for communication for a specified time period.

12. The apparatus according to claim 11, wherein determining to temporarily use the second clear channel assessment threshold is based on the apparatus' use of the spectrum relative to threshold usage level.

13. The apparatus according to claim 12, wherein the apparatus' use of the spectrum relative to the threshold usage level is calculated over a predefined time period.

14. The apparatus according to claim 12, wherein the apparatus' use of the spectrum relative to the threshold usage level is calculated as:
a number of successful transmissions by the apparatus on the spectrum over a predefined time period.

15. The apparatus according to claim 11, in which the specified time period comprises a backoff time during which the apparatus is prohibited from transmitting on the spectrum regardless of whether or not the apparatus senses the spectrum to be clear with respect to the second clear channel assessment threshold.

16. The apparatus according to claim 15, the method further comprising:
if the apparatus senses the spectrum to be not clear with respect to the second clear channel assessment threshold during the backoff time, initiate a time counter and transmit on the spectrum if the apparatus senses the spectrum to again be free with respect to a minimum clear channel assessment threshold at expiry of the time counter;
else if the apparatus senses the spectrum to be clear during the backoff time and if the apparatus senses the spectrum to be clear with respect to the second clear channel assessment threshold after the backoff time during the specified time period, transmit on the spectrum.

17. The apparatus according to claim 11, wherein determining to temporarily use a second clear channel assessment threshold is triggered by a periodic timer.

18. The apparatus according to claim 11, in which a start of the specified time period is synchronised with that of other mobile radio devices in a cell or basic service set.

19. A computer readable memory tangibly storing computer program code that when executed by at least one processor of an apparatus causes the apparatus to:
select a first clear channel assessment threshold that is higher than a minimum clear channel assessment threshold;
track at the apparatus a deferring time that represents an amount of time over a predefined time period during which the apparatus experienced a spectrum to be busy;
transmit to a radio access node the tracked deferring time;
receive from the radio access node a target deferring time;
compare the tracked deferring time with the target deferring time;
determine, based on the comparison, to temporarily use a second clear channel assessment threshold that is lower than the first clear channel assessment threshold; and
based on said determining, select and use the second clear channel assessment threshold for communication for a specified time period.

* * * * *

UNITED STATES PATENT AND TRADEMARK OFFICE
CERTIFICATE OF CORRECTION

PATENT NO. : 10,123,352 B2
APPLICATION NO. : 15/248029
DATED : November 6, 2018
INVENTOR(S) : Wessam Afifi Ahmed et al.

Page 1 of 1

It is certified that error appears in the above-identified patent and that said Letters Patent is hereby corrected as shown below:

In Claim 18:
Column 16, Line 39 "synchronised" should be deleted and --synchronized-- should be inserted.

Signed and Sealed this
Eleventh Day of December, 2018

Andrei Iancu
*Director of the United States Patent and Trademark Office*